Feb. 12, 1946.   L. E. SIMMONS   2,394,813
KERF CUTTING APPARATUS
Filed Dec. 26, 1941   3 Sheets-Sheet 1
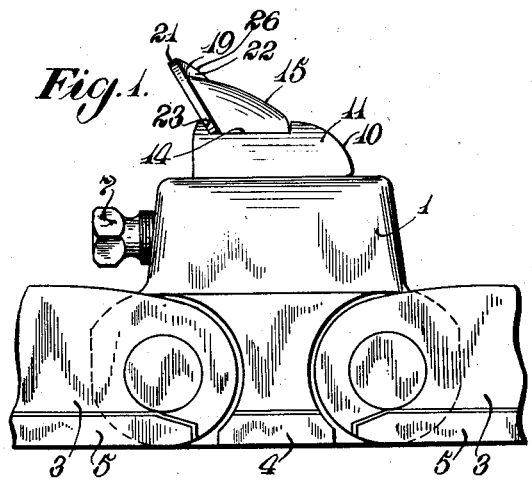
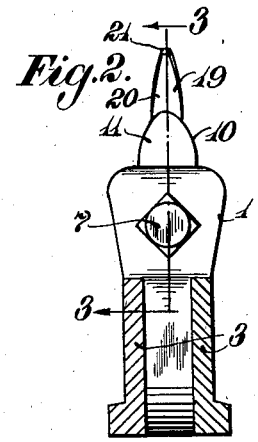
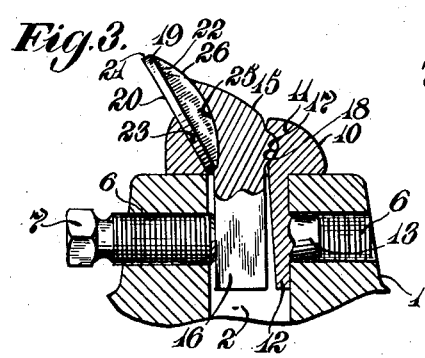
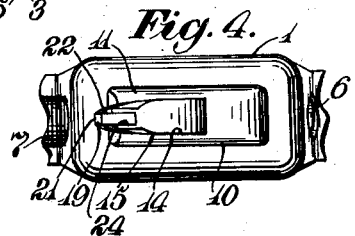
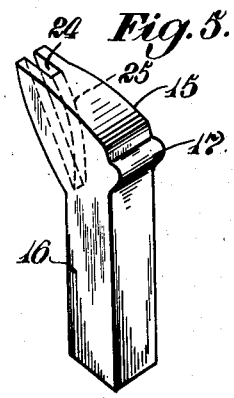
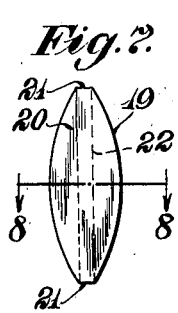
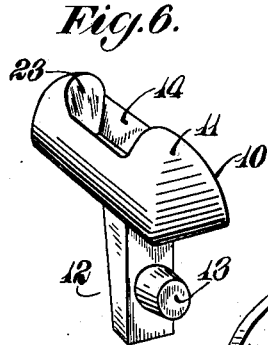
Inventor:
Leon E. Simmons.
by Lewis A. Maxson.
Att'y.

Feb. 12, 1946. L. E. SIMMONS 2,394,813
KERF CUTTING APPARATUS
Filed Dec. 26, 1941 3 Sheets-Sheet 2
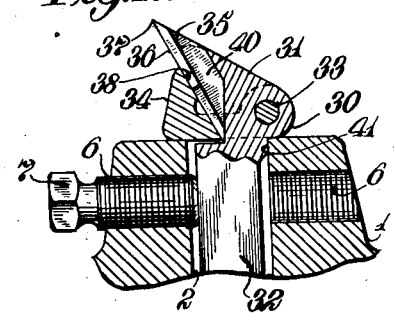
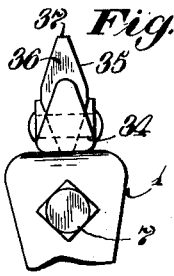
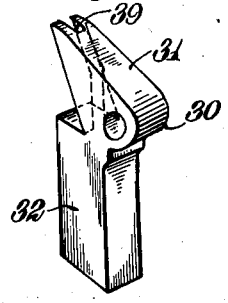
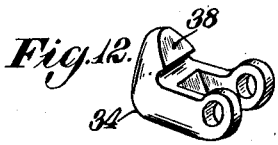
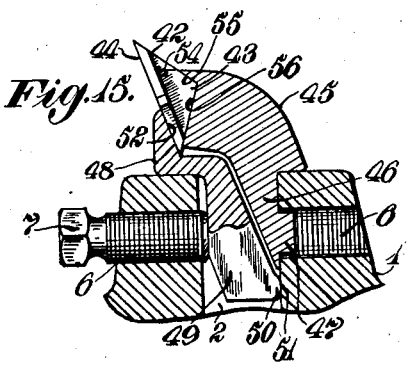
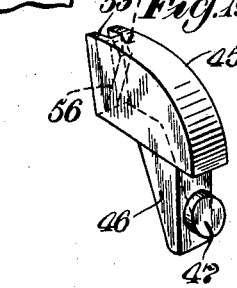
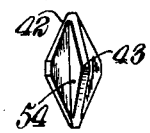
Inventor:
Leon E. Simmons.
by Louis A. Maxom
Atty.

Feb. 12, 1946.  L. E. SIMMONS  2,394,813
KERF CUTTING APPARATUS
Filed Dec. 26, 1941   3 Sheets-Sheet 3
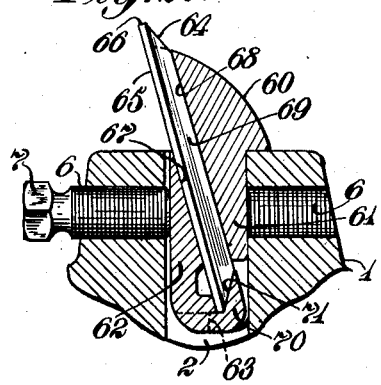
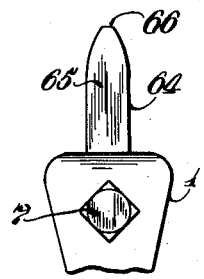
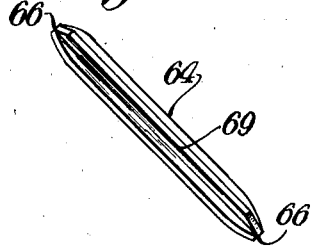
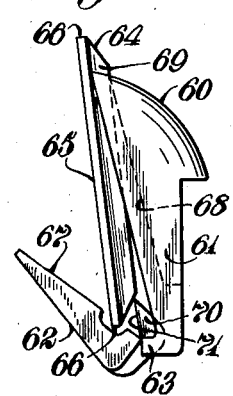
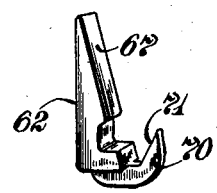
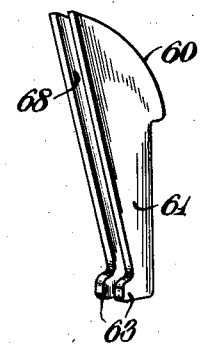
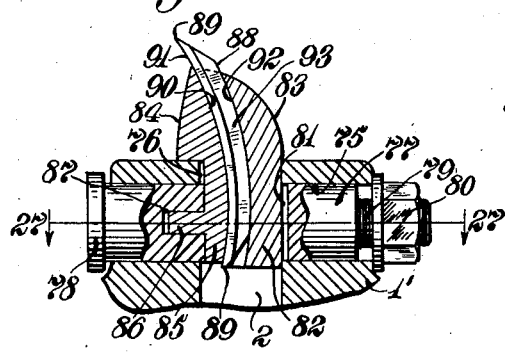
Inventor:
Leon E. Simmons.
by
Atty.

Patented Feb. 12, 1946

2,394,813

UNITED STATES PATENT OFFICE 2,394,813

KERF CUTTING APPARATUS

Leon E. Simmons, Claremont, N. H., assignor to Sullivan Machinery Company, a corporation of Massachusetts Application December 26, 1941, Serial No. 424,423

4 Claims. (Cl. 262—33)

This invention relates to kerf cutting apparatus, and more particularly to improvements in the cutter bits together with holding means for securing the cutter bits in cutting position on the chain blocks of a mining machine cutter chain. An object of the present invention is to provide an improved kerf cutting apparatus. Another object is to provide an improved cutter chain especially designed for use in a coal mining machine and having novel means for securing the cutter bits in cutting position on the chain blocks of the chain. Yet another object is to provide an improved cutter bit holding means attachable to the chain blocks of a standard cutter chain. A still further object is to provide an improved holder means for a cutter bit of the double-ended "throwaway" type. A further object is to provide improved means for firmly securing a double-pointed reversible cutter bit in cutting position on a standard chain block and embodying improved holder means having a novel socket arrangement for receiving a cutter bit and for securely holding the cutter bit in cutting position on a chain block. Yet another object is to provide an improved detachable bit holder adapted for reception in the right angle socket of a standard chain block. With these and other objects in view, this invention relates to certain novel features of construction, operation and arrangement of parts, several examples of which are given in the specification and illustrated in the accompanying drawings, wherein:

Fig. 1 is a side elevational view of a cutter chain in which a preferred illustrative form of the invention is embodied.

Fig. 2 is an end elevational view of the cutter chain shown in Fig. 1, with the strap links in cross section.

Fig. 3 is a view in longitudinal vertical section taken substantially on line 3—3 of Fig. 2.

Fig. 4 is a fragmentary plan view of the improved cutter chain.

Fig. 5 is a perspective view of the bit clamp.

Fig. 6 is a perspective view of the cutter bit holder.

Fig. 7 is a front plan view of the cutter bit.

Fig. 8 is a cross sectional view taken on line 8—8 of Fig. 7.

Fig. 9 is a perspective view of the cutter bit.

Fig. 10 is a sectional view similar to Fig. 3, showing another form of the invention.

Fig. 11 is a fragmentary front end elevational view of the cutter chain shown in Fig. 10.

Fig. 12 is a perspective view of the front clamp.

Fig. 13 is a perspective view of the bit holder.

Fig. 14 is a perspective view of a modified form of cutter bit, used with the clamp and holder of Figs. 12 and 13.

Fig. 15 is a sectional view similar to Figs. 3 and 10, showing still another form of the invention.

Fig. 16 is a fragmentary front end elevational view of the cutter chain shown in Fig. 15.

Fig. 17 is a perspective view of a further modified form of cutter bit.

Fig. 18 is a perspective view of the front clamp.

Fig. 19 is a perspective view of the bit holder.

Fig. 20 is a sectional view similar to Figs. 3, 10 and 15, showing a further form of the invention.

Fig. 21 is a fragmentary front end elevational view of the cutter chain shown in Fig. 20.

Fig. 22 is a detail view illustrating the manner of releasing the cutter bit from the holder.

Fig. 23 is a perspective view of a further modified form of cutter bit.

Fig. 24 is a perspective view of the front clamp.

Fig. 25 is a perspective view of the bit holder.

Fig. 26 is a sectional view, similar to Figs. 3, 10, 15 and 20, showing a still further form of the invention.

Fig. 27 is a longitudinally extending horizontal sectional view taken substantially on line 27—27 of Fig. 26.

In the several illustrative embodiments of the invention except the one shown in Figs. 26 and 27, the improved cutter bit and bit holder means are associated with a chain block 1 of a standard cutter chain, and the bit holder means is designed for reception in the right angle socket 2 of the chain block. A series of chain blocks are pivotally connected together by usual strap links 3, and the blocks and links have gibs 4 and 5 respectively, adapted to be slidingly guided in a guideway extending about the margin of a conventional cutter bar of a coal mining machine. The chain block has threaded openings 6, 6 adapted to receive a standard set screw 7. Since the cutter chain is of a well known form, further description and illustration thereof are herein unnecessary.

Now referring to the preferred embodiment of the invention shown in Figs. 1 to 9, inclusive, it will be noted that a clamp 10 has a head 11 resting against the exterior surface of the chain block and an integral shank 12 received in the chain block socket. The clamp shank has a rearward projection 13 which is received in the unused set screw opening 6. The clamp head has an opening 14 extending therethrough, and a removable bit holder 15 extends through this clamp opening with its leverlike shank portion 16 projecting within the block socket in advance of the clamp shank 12, in the manner shown in Fig. 3. The bit holder 15 has an arcuate pivot portion 17 which fits within a correspondingly shaped arcuate recess 18 in the rear wall of the head opening 14, so that the bit holder may rock about a transverse axis with respect to the clamp. A cutter bit 19 is received between the front part of the clamp head 11 and the bit holder, in the manner shown. The set screw 7 engages the leverlike shank 16 of the bit holder, so that when the set screw is tightened, the holder is rocked about its pivot with respect to the clamp to secure the cutter bit firmly in position. The cutter bit is T-shaped in cross section (Fig. 8) and has a plane front cutting face 20 of generally elliptical shape terminating at its opposite ends in cutting points 21, 21. Projecting from the back of the bit is a straight flange 22 which forms the leg of the T. The plane front face of the bit rests against an inclined rearwardly facing surface 23 formed on the clamp head at the front side of the opening 14, and the front face of the holder is vertically slotted at 24 to receive the rear bit flange 22. The holder slot 24 is curved at 25, at its inner side, and the outer edge of the bit flange 22 is correspondingly curved at 26, and these curved surfaces, when in engagement, serve to lock the cutter bit against endwise displacement from between the holder and clamp. By the provision of a cutter bit of the T-shaped cross section disclosed, the cutter bit may be firmly supported and rigidly held in cutting position on the chain block.

In the form of the invention shown in Figs. 10 to 14, inclusive, a bit holder 30 has a head 31 resting against the exterior surface of the chain block 1 and an integral shank 32 received in the chain block socket 2. Pivoted at 33, near the rear side of the holder head is a front clamp 34 which also engages the exterior block surface. A cutter bit 35, in this instance of trapezoidal shape in side elevation, has a plane front cutting face 36 of generally diamond shape terminating in cutting points 37, 37 at its opposite extremities. As in the form of cutter bit above disclosed, this cutter bit is of T-shape in cross section. The plane front face 36 of the cutter bit rests against an inclined, rearwardly facing surface 38 on the front clamp 34, and the front face of the holder head is vertically slotted at 39 to receive a rear flange 40 provided by the leg of the T. The set screw, when threaded inwardly within the front threaded opening in the block, engages the holder shank 32 and rocks slightly the holder at its point of pivotal contact at 41 with the rear wall of the block socket. This rocking movement of the holder causes the cutter bit to be firmly clamped in cutting position between the front clamp and holder head.

In Figs. 15 to 19, inclusive, which show still another form of the invention, a cutter bit 42 is disclosed which is essentially the same as that shown in Fig. 14 with the exception that the cutter bit is triangular in shape in side elevation and has an apex 43 opposite from its plane cutting face 44. A bit holder 45 has a shank 46 received in the block socket 2, and a projection 47 on the shank extends within the unused set screw opening. A front clamp 48 has a shank 49 received in the block socket in advance of the holder shank, and this clamp has a curved lug portion 50 which pivotally engages at 51 the rear wall of the block socket. The plane front face 44 of the cutter bit rests against a rearwardly inclined surface 52 on the front clamp, and the holder has its forward face vertically slotted at 53 to receive a rear flange 54 of the bit. This slot 53 has relatively inclined inner surfaces 55 and 56 which are arranged to engage the sides of the triangle near its apex 43, so that the cutter bit when clamped in position is held against displacement. The set screw when threaded inwardly within its opening engages the shank 49 of the front clamp to rock the latter about its point of pivotal contact 51 with the rear socket wall, thereby to clamp firmly the cutter bit in cutting position.

The form of the invention shown in Figs. 20 to 25, inclusive, includes a holder 60 having a shank 61 received in the block socket 2 and engaging the rear socket wall. Also received in the block socket is a front clamp 62, and the holder shank has at its inner end forwardly projecting lugs 63 which underlie the inner end of the front clamp. A cutter bit 64, likewise of T-shaped cross section and of elongated trapezoidal shape in side elevation, has an elongated plane front cutting face 65 of elongated elliptical shape terminating at its opposite ends in cutting points 66, 66. The front plane surface 65 of the cutter bit rests against an inclined rearwardly facing surface 67 on the front clamp, and the front face of the holder is slotted vertically at 68 to receive a rear flange 69 formed by the leg of the T. The inner end of the front clamp has a projection 70 which engages at 71 the inner rear surface of the cutter bit, so that when the holder and clamp are removed from the block socket the front clamp may be swung outwardly in the manner shown in Fig. 22, to cause the projection 70 to pry the cutter bit loose from the holder slot 68. The projection 70 also prevents inward displacement of the cutter bit within the holder slot. The set screw, when tightened, engages the front clamp, firmly to secure the cutter bit in cutting position between the front clamp and the holder.

In the form of the invention shown in Figs. 26 and 27, the chain block 1' has a longitudinally extending bore 75, and a slot 76 in the block communicates with this bore. Received in the block bore 75 is a holder bolt 77 provided with a front head 78. This bolt is threaded at 79 at its rear end and has threaded thereon a tightening nut 80. The bolt body is traversed by an opening 81 of rectangular shape which receives a shank 82 of a holder 83, the latter engaging the rear wall of the slot 76. A front clamp 84 has a shank 85 which projects within the bolt opening 81, and this shank has a polygonal projection 86 fitted within a slot 87 in the bolt. The front clamp rests against the exterior surface of the chain block, and the projection 86 prevents release of the front clamp from the bolt opening. A cutter bit 88, likewise of T-shaped cross section, is received between the clamp and holder, and the bit is, in this instance, of arcuate shape in side elevation and terminates at its opposite ends in cutting points 89, 89. The front clamp has a rearwardly facing curved surface 90 against which the arcuate front surface 91 of the cutter bit rests, and the front face of the holder is arcuately slotted vertically at 92 to receive a rear flange 93 formed by the leg of the T. When the nut 80 is tightened, the bolt is moved axially within the block bore 75, to clamp the cutter bit securely in cutting position between the rear wall of the block opening and the front wall of the opening 81 in the bolt.

In the several embodiments of the invention above described, the cutter bit, when the active point thereof becomes dull, may be readily released from its holder means and reversed end for end and again clamped in cutting position by its holder means on the block, thereby to present a sharp cutting point to the work. Also, since the cutter chain disclosed is of the reversible type, the bit holder means may be reversed with respect to the chain blocks, thereby to support the cutter bit in reverse cutting position. When the holder means is reversed on the chain blocks, the set screws of the first four embodiments, are, of course, transferred to the other threaded openings in the blocks. Also the longitudinal bolt may be reversed end for end in the longitudinal bores of the block, in the last embodiment described. The advantages and the modes of use of the several embodiments of the invention will be clearly apparent to those skilled in the art.

While there are in this application specifically described several forms which the invention may assume in practice, it will be understood that these forms of the same are shown for purposes of illustration and that the invention may be further modified and embodied in various other forms without departing from its spirit or the scope of the appended claims.

What I claim as new and desire to secure by Letters Patent is:

1. A detachable cutter bit holding means comprising a clamp having a head and a shank, the latter adapted for reception in the socket of a support and said clamp head having an opening therethrough, and a bit holder having pivotal contact with said clamp head at the rear side of the head opening, said bit holder extending within said head opening and having a shank arranged in adjacency to said clamp shank and also adapted for reception in the support socket.

2. In a cutter chain, a chain block having a socket, a clamp having a head and a shank, said shank extending within said block socket and said head having an opening therethrough, and a bit holder projecting within said head opening and pivotally engaging said clamp, said holder having a shank projecting within said block socket in advance of said clamp shank.

3. In a cutter chain, a chain block having a socket, a clamp having a head and a shank, said shank extending within said block socket and said head having an opening therethrough, a bit holder projecting within said head opening and pivotally engaging said clamp, said holder having a shank projecting within said block socket in advance of said clamp shank, and a cutter bit clamped in cutting position between said clamp head and said holder, said clamp head having a rearwardly facing surface in advance of said head opening against which said bit rests.

4. In a cutter chain, a detachable cutter bit holding means adapted for reception in the socket of a chain block and comprising a holder part having a head and a shank, the latter being receivable in the block socket and said head having an opening therethrough, and a bit holder part arranged in said head opening and having pivotal contact with said head at the rear side of the head opening.

LEON E. SIMMONS.